Jan. 9, 1962 R. T. ANDERSON ET AL 3,016,102
AUXILIARY VEHICLE AXLE
Filed Dec. 28, 1959
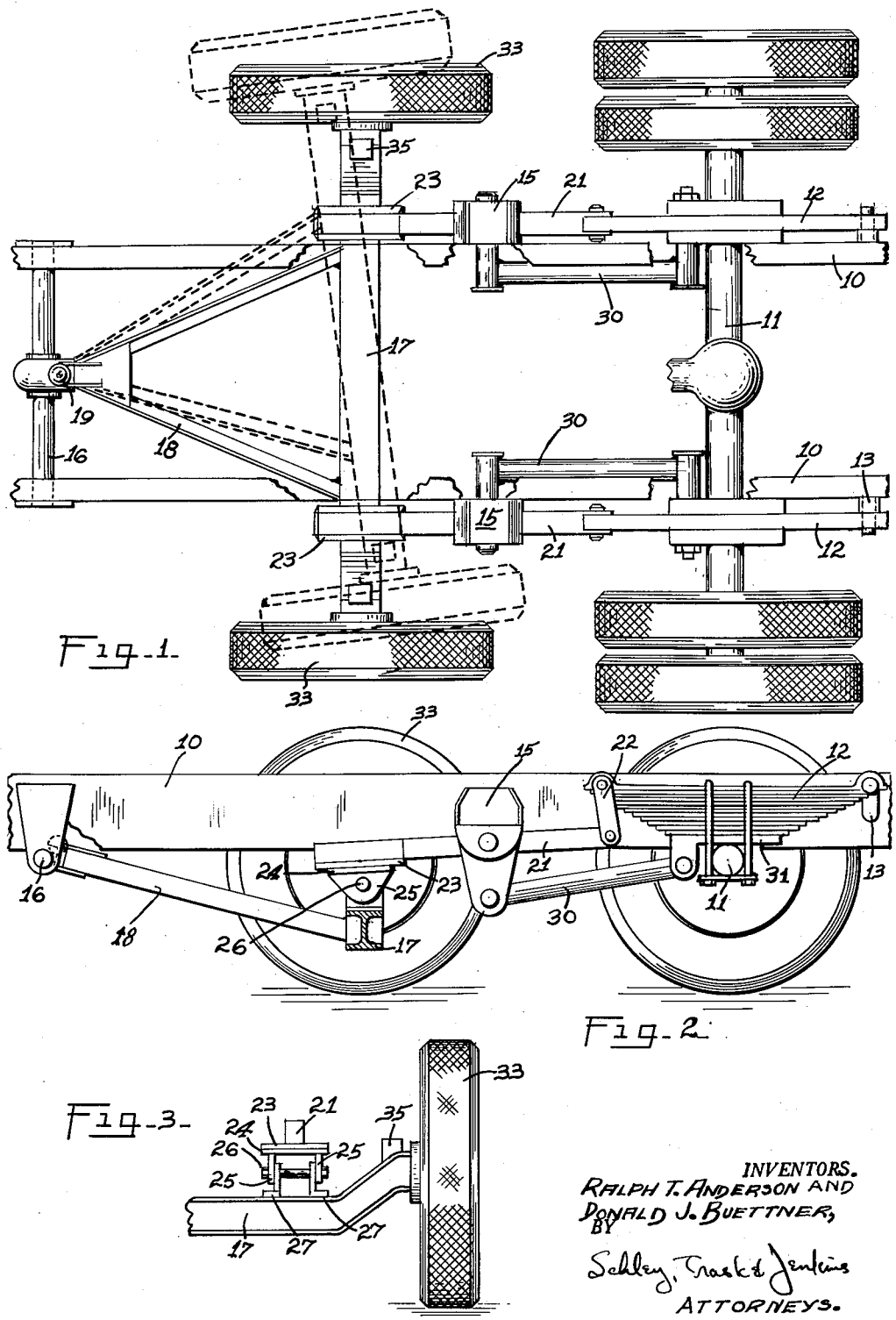
INVENTORS.
RALPH T. ANDERSON AND
DONALD J. BUETTNER,
BY
Schley, Trask & Jenkins
ATTORNEYS.

United States Patent Office 3,016,102
Patented Jan. 9, 1962

3,016,102
AUXILIARY VEHICLE AXLE
Ralph T. Anderson, 403 N. Cherry, Van Wert, Ohio, and
Donald J. Buettner, R.R. 1, Middle Point, Ohio
Filed Dec. 28, 1959, Ser. No. 862,288
4 Claims. (Cl. 180—22)

This invention relates to auxiliary, load-carrying axles adapted for attachment to trucks and similar vehicles. The invention is particularly concerned with an auxiliary axle which will not interfere with steering of the vehicle and which will support at least part of the weight applied to it through the conventional springs with which the vehicle is provided.

In carrying out the invention we secure to the sides of the truck frame in advance of the front ends of the conventional semi-elliptic truck springs a pair of brackets, and within each of such brackets we fulcrum an equalizer bar the rear end of which is connected by a shackle to the front end of the adjacent rear spring, such front end of the rear spring having first been disconnected from its usual attachment to the vehicle frame. The auxiliary axle is positioned beneath the front ends of the equalizer bars which rest thereon and transmit thereto a portion of the truck weight. The axle has a forwardly extending yoke or "wishbone" connected through a universal joint to the mid-point of an auxiliary cross member extending across and secured to the frame. To take the driving effort from the rear axle, radius rods extend between the rear springs and the aforesaid brackets. Preferably, the front ends of the equalizer bars do not rest directly on the auxiliary axle but instead rest on pads which are pivoted to the auxiliary axle on a horizontal transverse axis about which they can swing to maintain adequate bearing contact with the equalizer bars as the latter swing about their fulcrums.

Further features of the invention will become apparent from the detailed description which follows and from the accompanying drawings, in which:

FIG. 1 is a plan view of the rear end of a truck to which our auxiliary axle has been applied;

FIG. 2 is a side elevation of the construction illustrated in FIG. 1; and

FIG. 3 is a fragmental front elevation of the auxiliary axle.

We have shown our invention in the drawings as embodied in a truck having a frame which includes longitudinally extending side members 10, the rear end of such frame being supported from a rear axle housing 11 through semi-elliptic springs 12. Conventionally, the rear ends of the springs 12 are connected to the side members 10 through shackles 13, and the front ends of the springs are directly connected to the side members 10 to transmit the driving effort from the rear axle housing to the frame.

In adapting the truck such as described for embodiment of our invention, we remove the customary connections between the front ends of the rear springs and the frame members 10, and we secure to the frame members, in advance of the front ends of the rear springs, brackets 15. In addition, we secure to the frame well ahead of the brackets 15 an auxiliary cross member 16. The auxiliary axle 17 which we employ is located between the brackets 15 and cross member 16 and embodies a yoke 18 which is rigid with the axle 17 and which is connected to the auxiliary cross member 16 through a universal joint 19 permitting the axle both to swing laterally with respect to the truck and to rock about a horizontal axis longitudinally of the truck.

On each of the brackets 15 we fulcrum an equalizer bar 21 the front end of which extends forwardly over the auxiliary axle 17 and the rear end of which extends to a point below the front end of the rear spring 12 to which it is connected by a shackle 22. Secured as by welding to the lower surface of the front end of each equalizer bar 21 is a plate 23 resting on a pad 24 pivotally supported from the auxiliary axle 17 on a horizontal axis parallel to such axle. As will be clear from FIG. 3, such pivotal mounting of each of the pads 24 is effected by providing it with downwardly projecting ears 25 which rotatably receive a pin 26 supported from the axle 17 in brackets 27.

To replace the thrust-transmitting connection severed by disconnection of the front ends of the springs 12 from the side members 10, we employ radius rods 30 each of which has its front end pivoted to the adjacent bracket 15 on a horizontal axis and its rear end pivotally connected on a horizontal axis to a plate 31 mounted on the lower face of the spring 12.

It will be apparent from the construction as above described that the proportion of truck-weight transmitted through the brackets 15 is divided by the equalizer bars 21 between the auxiliary axle 17 and the front ends of the conventional rear springs 12. As a result, the auxiliary axle is permitted to move up and down relative to the truck frame. At the same time, the universal character of the joint 19 through which the auxiliary axle is connected to the frame permits such axle to swing laterally of the vehicle, thus allowing the wheels 33 on the ends of the auxiliary axle to "track" when the truck is turning a corner. The ability of the auxiliary axle to so swing greatly facilitates maneuvering of the truck. In swinging movement of the auxiliary axle, sliding movement exists between the plates 23 and the pads 24, and those elements have dimensions such that they remain in load-transmitting engagement throughout the swinging movement of the auxiliary axle. To limit swinging movement of the auxiliary axle which, in the absence of such limitation, might swing to such an extent that the pads 24 would be carried from beneath the plates 23, we may weld to the auxiliary axle stops 35 positioned to engage respectively the pads 23.

We claim as our invention:

1. In an automotive vehicle having a frame, a rear drive axle and semi-elliptical springs for supporting the frame from said axle, means connecting the rear end of each spring to said frame, an auxiliary axle having a forwardly extending yoke rigid with the auxiliary axle and connected at its front end to said frame through a universal joint permitting rocking and swinging of the auxiliary axle, said auxiliary axle having coaxial ground-engaging wheels at its ends, a pair of equalizer bars each pivoted intermediately to said frame on a transverse horizontal axis located between the auxiliary axle and the front end of the adjacent spring, and means operatively connecting the rear ends of the equalizer bars respectively to the front ends of said springs, the front ends of the equalizer bars resting on and having sliding engagement with said auxiliary axle substantially in the vertical plane containing the axis of said wheels.

2. The invention of claim 1 with the addition that the auxiliary axle includes pads pivotally connected independently of each other to the axle on an axis parallel thereto, said equalizer bars resting on said pads.

3. The invention of claim 2 with the addition of means for limiting swinging of said auxiliary axle to maintain engagement of the pads and equalizer bars.

4. In an automotive vehicle having a frame, a rear drive axle and semi-elliptical springs for supporting the frame from said axle, an auxiliary axle spaced longitudinally of the vehicle from the drive axle and having a forwardly extending yoke connected at its front end to the frame through a universal joint permitting rocking and swinging of the auxiliary axle, said auxiliary axle having coaxial ground-engaging wheels at its ends, a pair of equalizer bars pivoted intermediate their lengths on opposite sides of the frame on an axis extending transversely thereof, and means operatively connecting corresponding ends of said equalizer bars respectively to the adjacent ends of said springs, the opposite ends of said equalizer bars resting on and having sliding engagement with said auxiliary axle substantially in the vertical plane containing the axis of said wheels.

References Cited in the file of this patent

UNITED STATES PATENTS

| | | |
|---|---|---|
| 2,272,572 | Merry | Feb. 10, 1942 |
| 2,631,043 | Shaffer | Mar. 10, 1953 |
| 2,750,201 | Hagedorn | June 12, 1956 |

FOREIGN PATENTS

| | | |
|---|---|---|
| 971,256 | Germany | Dec. 31, 1958 |